(12) United States Patent
Kaluskar et al.

(10) Patent No.: US 7,100,171 B1
(45) Date of Patent: Aug. 29, 2006

(54) SYSTEM AND METHOD FOR AUTO-EVOLVABLE REMOTE PROCEDURE CALL STRUCTURES

(75) Inventors: Sanjay Kaluskar, Mountain View, CA (US); Lakshminarayanan Chidambaran, Fremont, CA (US); Sreenivas Gollapudi, Cupertino, CA (US); Archna Kalra Johnson, Sunnyvale, CA (US)

(73) Assignee: Oracle International Corp., Redwood Shores, CA (US)

( * ) Notice: Subject to any disclaimer, the term of this patent is extended or adjusted under 35 U.S.C. 154(b) by 569 days.

(21) Appl. No.: 10/144,563

(22) Filed: May 10, 2002

(51) Int. Cl.
*G06F 9/46* (2006.01)
(52) U.S. Cl. ................................. 719/330
(58) Field of Classification Search ............. 719/330
See application file for complete search history.

(56) References Cited

U.S. PATENT DOCUMENTS 5,926,636 A * 7/1999 Lam et al. ............... 719/330
6,493,768 B1 * 12/2002 Boutcher ................. 719/330
6,718,399 B1 * 4/2004 Chernick et al. ......... 719/330

\* cited by examiner

*Primary Examiner*—William Thomson
*Assistant Examiner*—Andy Ho
(74) *Attorney, Agent, or Firm*—Park, Vaughan & Fleming LLP

(57) ABSTRACT

A system and method for facilitating a remote procedure call (RPC) using an auto-evolvable RPC interface or record type (an "RPC structure"). Each field of an auto-evolvable RPC structure includes a version number and a default value. During a negotiation process, a client and a server exchange their highest version numbers, thereby indicating their RPC capabilities to each other. A higher or more recent version number may indicate a more recent release of the application comprising the RPC. During an RPC, when the client sends a structure to the server, or vice versa, and it has a more recent version, it may omit one or more fields that are not in the recipient's version. When the server receives a structure from the client, or vice versa, and it has a more recent version, it may populate an extra field (not in the sender's version) with its default value.

49 Claims, 3 Drawing Sheets

SYSTEM AND METHOD FOR AUTO-EVOLVABLE REMOTE PROCEDURE CALL STRUCTURES

BACKGROUND

This invention relates generally to the field of data communications. More particularly, a system and method are provided for enabling the automatic evolution of remote procedure call structures in a distributed computing environment.

In many distributed computing environments, a client process communicates with a server process via a remote procedure call (RPC). As part of a call, a pre-defined RPC interface is invoked to describe a requested operation or set of data. For example, one RPC interface invocation may constitute a request for the creation of a new user session. Another invocation may constitute a request for a set of data. A RPC interface may include any number of input and output arguments. These arguments may be of different data types, including scalars (e.g., numbers, text) and pre-defined RPC record types containing fields of one or more data types.

When a client or server is configured with an application that employs RPCs, it is equipped with knowledge of a static set of pre-defined RPC interfaces and record types, such as the current versions at the time of configuration. However, RPC interfaces and record types evolve over time, thereby leaving different entities (e.g., clients, servers) with different sets or versions.

Thus, over time, new RPC interfaces and record types are created (e.g., to request different types of data) and existing ones are augmented with additional fields or parameters. For example, an input or output parameter may be added to an RPC interface, or a field may be added to an RPC record type. When a new RPC interface or record type is released, or an existing one is modified, it is impractical to attempt to update all entities with the new or modified entity.

An application developer must expend great care and effort to ensure that a client or server endowed with a modified RPC interface or record type is able to communicate with another entity using an older version. Applications have typically handled this problem in one of two ways. First, an application may employ a self-describing structure comprising name/value pairs or using a markup language such as XML (Extensible Markup Language) or HTML (Hypertext Markup Language). The self-describing structure might contain information, in addition to its data, that allows an older computing device to pick out the fields known to it and ignore others.

However, an application employing a self-describing structure can only handle low-level changes because the framework for exchanging a self-describing structure must remain the same. And, the use and exchange of self-describing structures greatly increases the amount of data/information that must be communicated, thereby decreasing efficiency.

Second, the application may include logic designed to deduce a common set of structures understood by two communicating computer systems, and exchange those structures. However, the use of specialized logic merely transfers complexity from the RPC infrastructure to the application.

Thus, evolving an RPC interface or record type while maintaining the ability for devices having different versions of the interface or record type to use one in an RPC call has become very difficult for developers.

SUMMARY

Therefore, in one embodiment of the invention an auto-evolvable RPC (Remote Procedure Call) structure, and methods of using an auto-evolvable RPC structure, are provided. The term "RPC structures" should be understood to encompass RPC interfaces and/or RPC record types.

In this embodiment, fields or values of an RPC structure are augmented with version identifiers and default values. The highest or most recent version identifier of a structure may indicate the version of the structure. Alternatively, the header of an RPC structure may include a version number. The highest version identifier within all RPC structures of an entity (e.g., a client, a server) may indicate its RPC capability.

In a negotiation process, one entity's highest version identifier is compared to another entity's highest version identifier. This allows them to determine which of them has greater or more recent RPC capability, or a more recent version of a structure.

In an embodiment of the invention, a client sends a corresponding RPC structure with a remote procedure call, and a server returns an appropriate structure in response to the call. If a sender of a structure has a more recent version identifier than the recipient, the sender may omit one or more fields or components that are part of its version of the structure, but which are not part of the recipient's version of the structure.

When a recipient of an RPC structure receives the structure, it may have a more recent version that includes one or more fields that are not part of the sender's version. Therefore, the recipient may populate an extra field with a predefined or dynamic default value.

In an embodiment of the invention, an auto-evolvable RPC structure may include a union comprising one of two or more mutually exclusive fields. In this embodiment, a header of the structure is configured with a discriminant value to indicate which of the fields is included in the structure.

DETAILED DESCRIPTION

Figure 1:
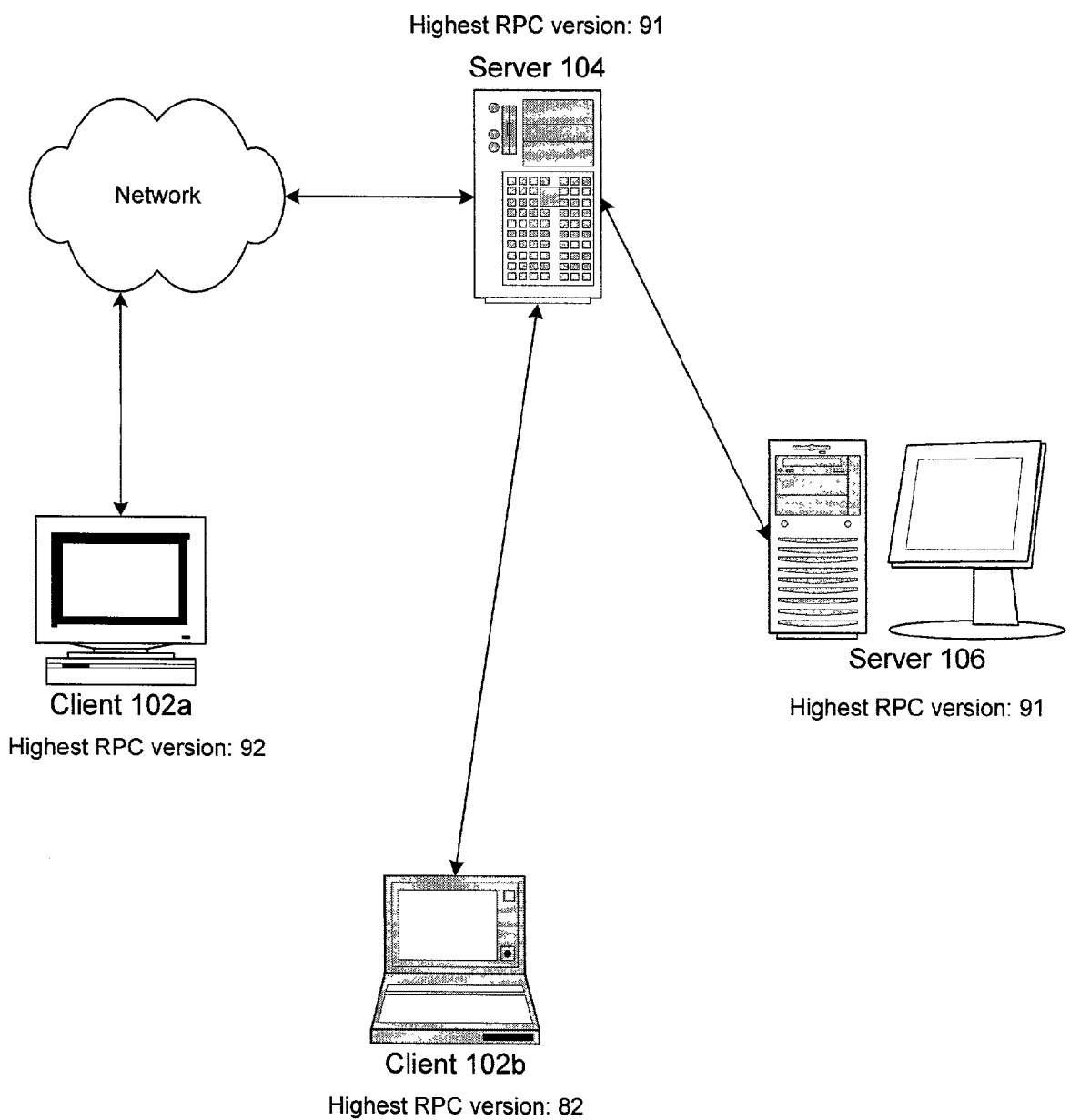
FIG. 1 depicts a distributed computing environment in which an embodiment of the present invention may be implemented.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

In one embodiment of the invention, an auto-evolvable RPC (Remote Procedure Call) interface or record type (hereinafter referred to as a "structure") is provided, along with methods of using an auto-evolvable RPC structure. In this embodiment, a structure is made auto-evolvable by incorporating within it means for identifying the version of the structure. An auto-evolvable RPC structure may also be augmented with a default value for one or more fields of the structure.

A remote procedure call typically involves a predefined communication format between a client and a server. The server is typically a robust computer system configured to service requests from multiple clients. The client may comprise a client device or process (e.g., a wired or wireless computer, a web browser, an application interface), or another server. An RPC may be invoked to request data or a service, and is usually answered with a response containing the data or a result of the service.

In this embodiment of the invention, a remote procedure call is similar to a local procedure call, but is submitted to a remote entity (e.g., a server). Illustratively, a remote procedure call uses a first structure as an argument submitted as a request to the remote entity, and a second structure is returned as a response to the call.

A client and a server may be configured with different versions of an RPC structure. Therefore, version numbers used to make structures auto-evolvable in an embodiment of the invention allow the devices to easily identify a set or subset of versions that they both understand. Illustratively, a client and a server may inform each other of the highest version numbers they are configured with. If one entity understands a higher version than the other, the one entity may amend its request or response structure so that it can be understood by the other entity.

For example, when the one entity issues a request structure, the entity may omit a field that is part of its version of the structure but which is not part of the version of the structure known to the other entity. Or, when receiving a response structure from the other entity, which is formatted according to the other entity's older version of the structure, the one entity may populate such a field with a default value from its newer version.

FIG. 1 depicts a distributed computing environment in which an embodiment of the invention may be implemented. Clients 102a, 102b and servers 104, 106 operate or support an application such as a database management system (DBMS), web browsing, etc. Clients 102a, 102b and server 106 communicate with server 104 using an application protocol that employs or supports an RPC mechanism or communication using RPC structures.

Thus, the application protocol used by the application to interface between remote entities employs RPC structures to facilitate requests and responses. An illustrative application protocol that supports RPC and that may be employed in FIG. 1 is TTC (Two Task Communications), a protocol utilized between processes within an Oracle® Server DBMS (Database Management System) environment. In this example, clients 102a, 102b may execute client processes or applications. Servers 104, 106 operate database server processes, but may also act as clients to make RPCs to each other.

In FIG. 1, a procedure call may comprise a request for data, information, or some action relating to the application they have in common. Calls may be submitted to server 104 by any or all of clients 102a, 102b and server 106, in the form of appropriate RPC structures. Similarly, a response from server 104 is formatted according to the appropriate RPC structure.

An entity, such as client 102a, needing to communicate with server 104 may employ a different set of RPC structures, or different versions of structures, than server 104. For example, client 102a may be configured with one release of the application, while server 104 is configured with a different release. Therefore, each of them may need to know what structures or structure versions the other can understand before one can send or respond to an RPC. As described below, the communicating entities may exchange information regarding which structures or structure versions they understand, or negotiate to determine a common set of structures or structure versions.

Each RPC structure used in an RPC comprises one or more fields, and each field may include one or more arguments or parameters. In an embodiment of the invention, a structure is made auto-evolvable by including, within a field, a default value for the field and a version number or version identifier.

The version number in this embodiment is a monotonically increasing value expressed numerically, alphabetically or alphanumerically, and identifies the version of the field; the default value is a value to be assigned to the field if a value is not provided by the other entity participating in a call. Besides identifying the version of its field, the highest version number of a structure's fields may identify the version of the structure, and the highest version number of all structures may identify the entity's highest RPC capability.

Different fields may have different version numbers and/or default values—within one structure and across multiple structures. In one embodiment of the invention, when a field is added to an existing structure, the version numbers of the existing fields remain the same; only the new field receives a newer version number.

In embodiments of the invention described herein, a higher version number indicates a newer or more recent version of an RPC structure. Other embodiments may be derived therefrom, in which newer version numbers are lower than, or have some other relation to, previous version numbers, without exceeding the scope of the invention.

Because field version numbers are monotonically increasing in an embodiment of the invention, they may be used to indicate the RPC "capability" of a process or entity (e.g., a client or a server). In particular, entities engaging in RPCs may identify to each other the highest version number among the structures they are configured for. They will then each know the relative capability of the other.

Thus, in FIG. 1, the highest version numbers within the RPC structures known to servers 104, 106 are both equal to 91. Illustratively, this version number may correspond to version 9.1 of the application. Client 102a has a highest version of 92, while client 102b has a highest version number of 82. Thus, client 102a may have a more recent release and/or greater RPC capability than client 102b and servers 104, 106. Client 102b has a lower RPC capability than the other devices and less recent RPC structures.

In different embodiments of the invention, a field version number may be derived differently. For example, in one embodiment, a version number is derived from a release of the application. With each release of the application, if any structures in that release are new or altered from the previous release, those structures will have a new (e.g., higher) version number in the affected field(s). There need not, however, be a one-to-one correspondence between application releases and field version numbers.

In another embodiment of the invention, a version number may comprise or be derived from an identity of a structure. For example, each structure known to a client or server may be identified with a separate structure type, which may have a numerical value. A structure's type may be included as an argument or parameter in a header of the structure.

In one implementation of this embodiment, a field version number may be derived from the maximum type number of the RPC structures in a particular release of an application. In this implementation, each RPC structure is assigned a unique type number, which monotonically increases with each new structure. Thus, if a particular application release includes a set of RPC structures having type numbers 1 through 20, any new fields added to an auto-evolvable RPC structure in the set would be assigned a version number of 20. However, this may require a maximum type number to be increased if a structure evolves (e.g., receives a new field), even if no new structures are added.

In an embodiment of the invention, an RPC structure is considered auto-evolvable because as the structure evolves to include new fields, those new fields include new version numbers and indicate the host entity's current capability regarding RPC structures. Similarly, a new structure is configured with the newest or most recent version number (e.g., in each field).

The following is a sample auto-evolvable RPC structure, according to one embodiment of the invention:

Record name: as Fields: Name: f1, version: 820
Name: f2, version: 840 (1)

When a field is added to a structure or otherwise augmented with a version identifier (the version field above), it will generally be given the most recent or current identifier. A "master" version identifier or counter may be regularly incremented or increased (e.g., with each release of the application), and a new field's version identifier may be copied from the master.

In one embodiment of the invention, an auto-evolvable RPC structure may include a union. As one skilled in the art will recognize, a union comprises two or more mutually exclusive fields, while a corresponding discriminant indicates which of the fields is present. The following example auto-evolvable RPC structure includes a union of two fields (f1 and f2):

Record name: s Union of fields: Name: f1, version:
850

Name: f2, version: 850 With discriminant d (2)

In example (2), record s is an RPC structure that includes a union and corresponding discriminant d. The union is of fields f1 and f2. A value for only one of these fields will be transmitted as part of the structure, and the value of discriminant d indicates which of the two fields is included.

In one embodiment of the invention, the discriminant may be included as part of a header of the structure. Then, when an RPC structure containing a union is transmitted, the recipient can immediately identify the structure as containing a union because of the information in the structure header (e.g., the record is specifically identified as a union). And, because the discriminant is included in the header, the recipient knows which of the union fields is included and can therefore receive and handle it properly.

Figure 2:
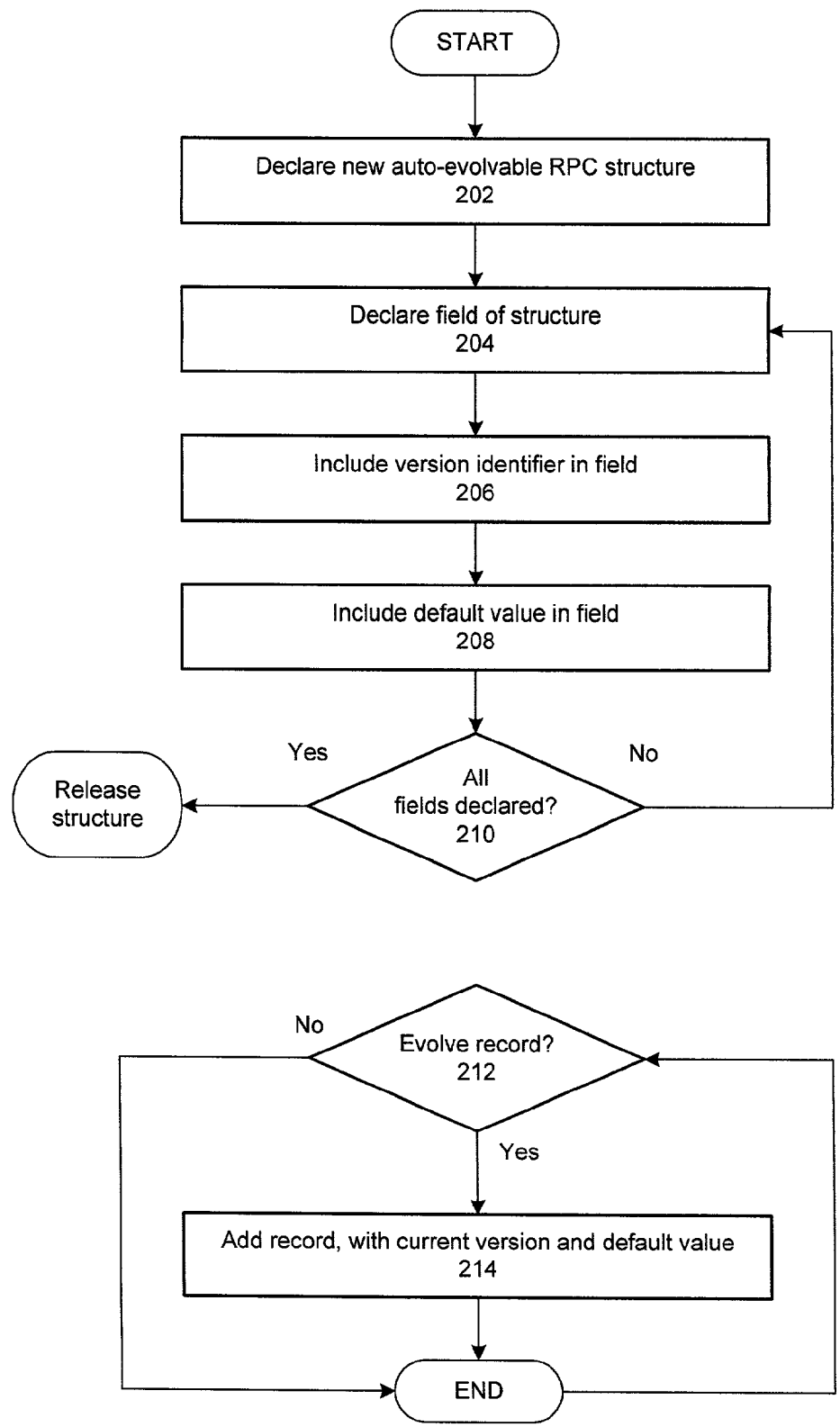
FIG. 2 is a flowchart demonstrating one method of making an RPC structure auto-evolvable, in accordance with an embodiment of the invention.

FIG. 2 is a flowchart demonstrating one method of defining an auto-evolvable RPC structure, according to one embodiment of the invention.

In state 202, a new auto-evolvable RPC structure is declared.

In state 204, a field of the structure is declared.

In state 206, a version identifier is included in the declared field. Illustratively, the version identifier corresponds to the current version of the application in which the structure is employed.

In state 208, a default value matching the type of the field (e.g., char, integer, word) is included in the declared field.

In state 210, if all fields of the new auto-evolvable RPC structure have been declared, the declared structure is released; otherwise, the procedure returns to state 204.

In state 212, it is determined whether the auto-evolvable RPC structure must evolve (e.g., to receive a new field). If so, the method proceeds to state 214.

In state 214, the RPC structure is augmented with a new field, which includes a current version identifier and a default value. The method then ends.

Figure 3:
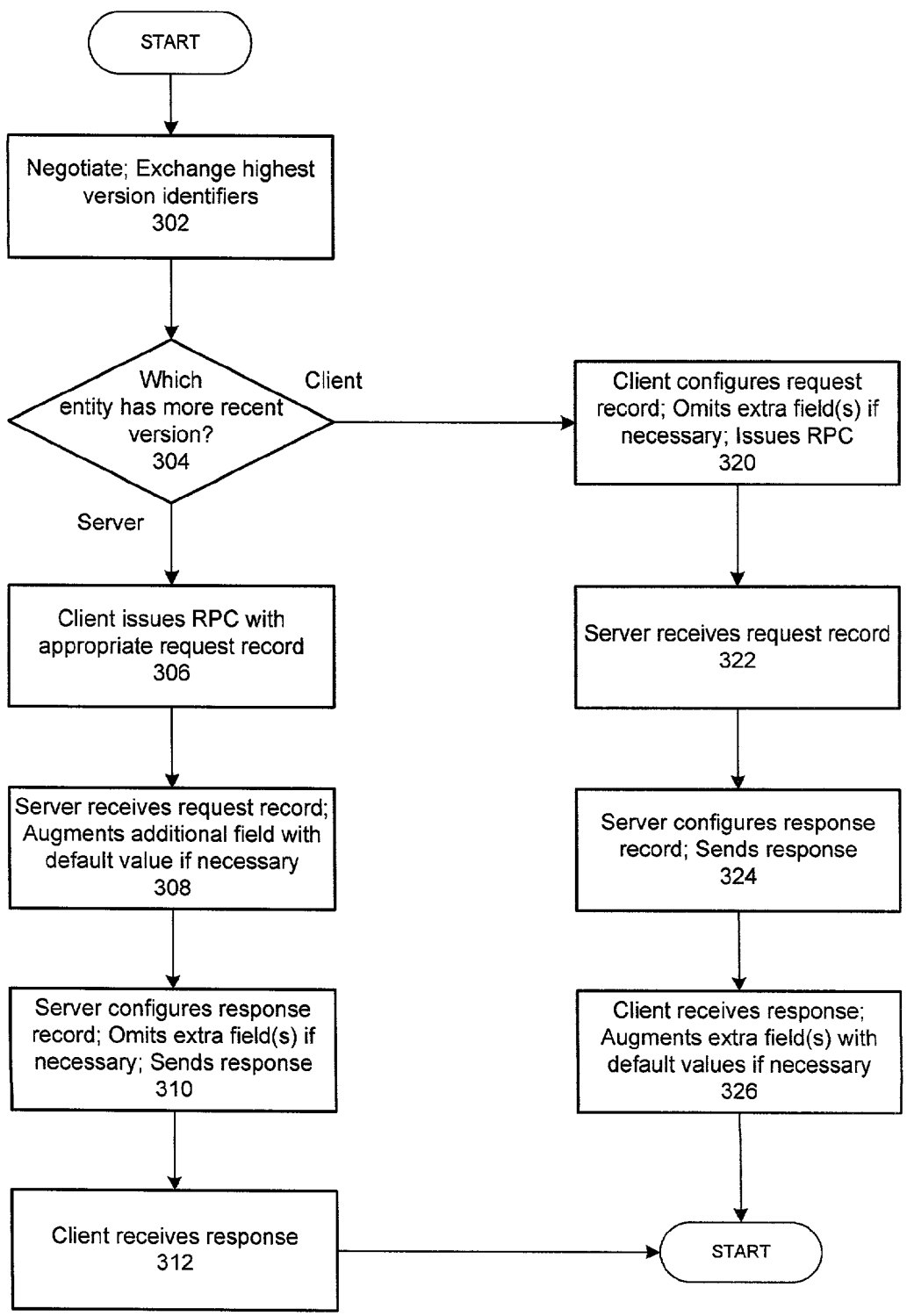
FIG. 3 is a flowchart demonstrating one method of using an auto-evolvable RPC structure in a remote procedure call, in accordance with an embodiment of the invention.

FIG. 3 is a flowchart demonstrating a method of making an RPC with an auto-evolvable RPC structure, according to one embodiment of the invention. In this embodiment, a client and a server operate a common application (e.g., a DBMS) and communicate via remote procedure calls. Each entity is configured with a set of RPC structures (at least one version of each) that it uses for the application.

In state 302, the client and server negotiate by exchanging the highest version identifier in each entity's corresponding set of RPC structures. In one alternative embodiment of the invention, the client and server may exchange just the highest version identifier within one or more particular structures they are going to exchange.

In state 304, the client and server determine which of them has the more recent version identifier, thereby indicating greater RPC capability. Illustratively, the entity with the highest version identifier is more up-to-date. If the server has the more recent version identifier, the illustrated method continues at state 306; otherwise, the method advances to state 320.

In state 306, the client issues an RPC with an appropriate RPC structure. If the request structure includes a union, a header of the structure may include a discriminant indicating which of the mutually exclusive or alternative fields is included in the structure. Because the server has greater RPC capability or knowledge, the client can send its full version of the structure.

In state 308, the server receives the RPC and the request structure. If its (more recent) version of the structure includes an additional field, argument or parameter, the server may populate the field with a predetermined default value. For example, the server may need to use the extra field to enable successful or complete operation of a data retrieval or other operation.

In state 310, the server executes the call and configures or assembles an RPC structure to return to the client. Any fields that are part of the server's version of the structure, but not the client's, are omitted. The response structure is then sent to the client.

In state 312, the client receives the response structure, which is formatted according to the version of the structure understood by the client. The method then ends.

In state 320, the client has a more recent or up-to-date set of RPC structures. Therefore, the client configures a structure to be sent with an RPC by omitting any fields that are not part of the server's version of the structure. The client then issues an RPC and sends the request structure.

In state 322, the server receives the RPC and request structure, which is formatted according to the server's version of the structure.

In state 324, the server has executed the call and configures a response structure to return to the client. Because the server's version of the structure is older, or the same as, the client's version, the server need not change the configuration of the structure. However, if the structure contains a union, the server may ensure that a correct discriminant value is placed in a header of the structure. The response structure is then sent to the client.

In state 326, the client receives the response. If its version of the structure contains any additional fields (e.g., which may be needed to display or operate on a set of data), those fields may be populated with predetermined default values included in its set of RPC structures. The method then ends.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of making a remote procedure call (RPC) from a client, the method comprising:
   installing on a client a first set of RPC structures, wherein each RPC structure in the first set of RPC structures comprises:
   a set of fields; and
   for each field in the set of fields, a version identifier, wherein the version identifier reflects the current version of a given field within the RPC structure and is independent of version identifiers for other fields in the RPC structure, whereby the version identifier for each field in the set of fields within a given RPC structure is used to identify a common set of fields between a set of RPC structures;
   at the client, comparing a first version identifier representing a highest version of a field of an RPC structure within the first set of RPC structures of the client with a second version identifier representing a highest version of a field of an RPC structure within a second set of RPC structures of the remote computing entity;
   transmitting a remote procedure call to the remote computing entity, with a first RPC structure of the first set of RPC structures; and
   before said transmitting, if said first version identifier is more recent than the second version identifier, omitting one or more fields of the first RPC structure from said transmission.

2. The method of claim 1, wherein each RPC structure in the first set of RPC structures further comprises, for each field in the set of fields, a default value.

3. The method of claim 1, further comprising, prior to said comparing, sending said first version identifier to the remote computing entity; and
   receiving from the remote computing entity the second version identifier.

4. The method of claim 1, wherein two or more fields of the first RPC structure are mutually exclusive in that only one of said two or more fields is included in the first RPC structure when the first RPC structure is transmitted to the remote computing entity.

5. The method of claim 4, wherein the first RPC structure further comprises a discriminant configured to identify which of said two or more fields is included in the first RPC structure.

6. The method of claim 1, further comprising:
   receiving from the remote computing entity a second RPC structure; and
   if said first version identifier is more recent than the second version identifier, augmenting the fields of the second RPC structure with one or more fields having predefined default values.

7. The method of claim 6, wherein said receiving comprises receiving a discriminant within the second RPC structure, the discriminant indicating which of two or more mutually exclusive fields are included in the second RPC structure.

8. A computer readable storage medium storing instructions that, when executed by a computer, cause the computer to perform a method of making a remote procedure call (RPC) from a client, the method comprising:
   installing on a client a first set of RPC structures, wherein each RPC structure in the first set of RPC structures comprises:
   a set of fields; and
   for each field in the set of fields, a version identifier, wherein the version identifier reflects the current version of a given field within the RPC structure and is independent of version identifiers for other fields in the RPC structure, whereby the version identifier for each field in the set of fields within a given RPC structure is used to identify a common set of fields between a set of RPC structures;
   at the client, comparing a first version identifier representing a highest version of a field of an RPC structure within the first set of RPC structures of the client with a second version identifier representing a highest version of a field of an RPC structure within a second set of RPC structures of the remote computing entity;
   transmitting a remote procedure call to the remote computing entity, with a first RPC structure of the first set of RPC structures; and
   before said transmitting, if said first version identifier is more recent than the second version identifier, omitting one or more fields of the first RPC structure from said transmission.

9. A method of accepting a remote procedure call (RPC) at a server, the method comprising:

installing on a client a first set of RPC structures, wherein each RPC structure in the first set of RPC structures comprises:
   a set of fields; and
   for each field in the set of fields, a version identifier, wherein the version identifier reflects the current version of a given field within the RPC structure and is independent of version identifiers for other fields in the RPC structure, whereby the version identifier for each field in the set of fields within a given RPC structure is used to identify a common set of fields between a set of RPC structures;

at the server, comparing a first version identifier representing a highest version of a field of an RPC structure within the first set of RPC structures of a client with a second version identifier representing a highest version of a field of an RPC structure within a second set of RPC structures of the server;

receiving a remote procedure call from the client, with a first RPC structure; and if said second version identifier is more recent than the first version identifier, augmenting the first RPC structure with one or more fields having default values.

10. The method of claim 9, wherein each RPC structure in the second set of RPC structures further comprises, for each field in the set of fields, a default value.

11. The method of claim 9, further comprising, prior to said comparing, sending said second version identifier to the client; and
   receiving from the client the first version identifier.

12. The method of claim 9, wherein said receiving comprises receiving a discriminant within the first RPC structure, the discriminant indicating which of two or more mutually exclusive fields are included in the first RPC structure.

13. The method of claim 9, further comprising:
   in response to the remote procedure call, returning a second RPC structure to the client; and
   if said second version identifier is more recent than the first version identifier, omitting one or more fields from the second RPC structure prior to said returning.

14. The method of claim 13, wherein two or more fields of the second RPC structure are mutually exclusive in that only one of said two or more fields is included in the second RPC structure when the second RPC structure is returned to the client.

15. The method of claim 14, wherein the second RPC structure further comprises a discriminant configured to identify which of said two or more fields is included in the second RPC structure.

16. A computer readable storage medium storing instructions that, when executed by a computer, cause the computer to perform a method of accepting a remote procedure call (RPC) at a server, the method comprising:
   installing on a client a first set of RPC structures, wherein each RPC structure in the first set of RPC structures comprises:
     a set of fields; and
     for each field in the set of fields, a version identifier, wherein the version identifier reflects the current version of a given field within the RPC structure and is independent of version identifiers for other fields in the RPC structure, whereby the version identifier for each field in the set of fields within a given RPC structure is used to identify a common set of fields between a set of RPC structures;

at the server, comparing a first version identifier representing a highest version of a field of an RPC structure within the first set of RPC structures of a client with a second version identifier representing a highest version of a field of an RPC structure within a second set of RPC structures of the server;

receiving a remote procedure call from the client, with a first RPC structure; and if said second version identifier is more recent than the first version identifier, augmenting the first RPC structure with one or more fields having default values.

17. A computer implemented method of making a remote procedure call (RPC) structure auto-evolvable, comprising:
   identifying an RPC structure comprising:
     a header configured to indicate a type of the RPC structure; and
     a set of fields, each field indicating a type of the field; and
   for each field in the set of fields, augmenting the RPC structure with:
     a version identifier configured to identify a version of the field, wherein the version identifier reflects the current version of a given field within the RPC structure and is independent of version identifiers for other fields in the RPC structure, whereby the version identifier for each field in the set of fields within a given RPC structure is used to identify a common set of fields between a set of RPC structures; and
     a default value for the field.

18. The method of claim 17, wherein a version of the RPC structure is indicated by the highest version identifier in the set of fields.

19. The method of claim 17, wherein the version identifier of a field corresponds to a release of an application comprising the RPC structure.

20. A distributed computing environment for conducting a remote procedure call (RPC), comprising:
   a client configured to issue a remote procedure call, the client comprising:
     a first set of RPC structures, each RPC structure including:
       a set of fields; and
       for each field in the set of fields, a version identifier; and
     a client negotiation module configured to identify a first most recent version identifier among the version identifiers in the first set of RPC structures; and
   a server configured to receive a remote procedure call, the server comprising:
     a second set of RPC structures, each RPC structure including:
       a set of fields; and
       for each field in the set of fields, a version identifier, wherein the version identifier reflects the current version of a given field within the RPC structure and is independent of version identifiers for other fields in the RPC structure whereby the version identifier for each field in the set of fields within a given RPC structure is used to identify a common set of fields between a set of RPC structures; and
     a server negotiation module configured to identify a second most recent version identifier among the version identifiers in the second set of RPC structures; and
   a communication link coupling the client and the server.

21. The distributed computing environment of claim 20, wherein:
   each RPC structure in the first set of RPC structures further includes a header identifying the type of the RPC structure; and
   each RPC record in the second set of RPC structures further includes a header identifying the type of the RPC structure.

22. The distributed computing environment of claim 20, wherein:
   a header of a first RPC structure in the first set of RPC structures further includes a discriminant configured to indicate which one of two or more mutually exclusive fields is included in the first RPC structure.

23. The distributed computing environment of claim 20, wherein:
   a header of a first RPC structure in the second set of RPC structures further includes a discriminant configured to indicate which one of two or more mutually exclusive fields is included in the first RPC structure.

24. The distributed computing environment of claim 20, wherein:
   the client is configured to omit one or more fields of a first RPC structure in the first set of RPC records when transmitting the first RPC structure to the server if the first most recent version identifier is more recent than the second most recent version identifier; and
   the server is configured to omit one or more fields of a second RPC structure in the second set of RPC structures when transmitting the second RPC structure to the server if the second most recent version identifier is more recent than the first most recent version identifier.

25. The distributed computing environment of claim 20, wherein:
   each field in an RPC structure in the first set of RPC structures further includes a default value for the field; and
   each field in an RPC structure in the second set of RPC structures further includes a default value for the field.

26. The distributed computing environment of claim 20, wherein:
   the server is configured to augment the fields of a first RPC structure received from the client with one or more fields having predefined default values if the second most recent version identifier is more recent than the first most recent version identifier; and
   the client is configured to augment the fields of a second RPC structure received from the server with one or more fields having predefined default values if the first most recent version identifier is more recent than the second most recent version identifier.

27. A computer system configured to initiate a RPC (remote procedure call) to a remote computing entity, the computer system comprising:
   a first set of RPC structures configured for use as argument in remote procedure calls, each said RPC structure comprising:
      a set of fields; and
      for each field in said set of fields, a corresponding version identifier, wherein the version identifier reflects the current version of a given field within the RPC structure and is independent of version identifiers for other fields in the RPC structure, whereby the version identifier for each field in the set of fields within a given RPC structure is used to identify a common set of fields between a set of RPC structures;
   a negotiation module configured to communicate to the remote computing device a first most recent version identifier among said version identifiers within said first set of RPC structures; and
   a communication module configured to facilitate communication of a first remote procedure call and a first RPC structure to the remote computing device.

28. The computer system of claim 27, wherein each RPC structure in said first set of RPC structures further comprises a header identifying the type of said RPC structure.

29. The computer system of claim 27, wherein each RPC structure in said first set of RPC structures further comprises a default value for each field in said set of fields.

30. The computer system of claim 27, wherein said negotiation module is further configured to receive from the remote computing entity a second most recent version identifier from a second set of RPC structures on the remote computing entity.

31. The computer system of claim 30, wherein:
   said first most recent version identifier is more recent than said second most recent version identifier; and
   a field corresponding to said first most recent version identifier is omitted from said first RPC structure when said communication module communicates said remote procedure call and first RPC structure to the remote computing entity.

32. The computer system of claim 27, wherein two or more fields of said set of fields in said first RPC structure are mutually exclusive in that only one of said two or more fields is included in said first RPC structure when said communication module communicates said remote procedure call and first RPC structure to the remote computing entity.

33. The computer system of claim 32, wherein said first RPC structure further comprises a discriminant identifying which of said two or more fields is included in said first RPC structure.

34. The computer system of claim 27, wherein one of said negotiation module and said communication module comprises the other of said negotiation module and said communication module.

35. The computer system of claim 27, wherein said communication module is further configured to receive, in response to said remote procedure call, a second RPC structure from the second set of RPC structures, said second RPC structure having a corresponding RPC structure in said first set of RPC structures.

36. The computer system of claim 35, wherein:
   each RPC structure in said first set of RPC structures further comprises a default value for each field in said set of fields; and
   if said corresponding RPC structure comprises one or more fields not included in the second RPC structure, the one or more fields are populated with said default values.

37. A computer system configured to receive a RPC (remote procedure call) from a remote computing entity having a first set of RPC structures, the computer system comprising:
   a negotiation module configured to:
      receive from the remote computing entity a first version identifier identifying a first most recent version of an RPC structure field within the first set of RPC structures; and transmit to the remote computing entity a second version identifier identifying a second most recent version of an RPC structure field within a second set of RPC structures;

said second set of RPC structures, wherein each said RPC structure in said second set of RPC structures comprises:

a set of fields; and for each field in said set of fields, a corresponding version identifier, wherein the version identifier reflects the current version of a given field within the RPC structure and is independent of version identifiers for other fields in the RPC structure, whereby the version identifier for each field in the set of fields within a given RPC structure is used to identify a common set of fields between a set of RPC structures;

a communication module configured to receive a first remote procedure call and a first RPC structure from the remote computing entity; and a processor configured to execute the first remote procedure call.

38. The computer system of claim 37, wherein each said RPC structure in said second set of RPC structures further comprises a header identifying the type of said RPC structure.

39. The computer system of claim 37, wherein each said RPC structure in said second set of RPC structures further comprises a default value for each field in said set of fields.

40. The computer system of claim 39, wherein:

the first RPC structure received with the first remote procedure call includes a first set of fields;

a second RPC structure in said second set of RPC structures corresponds to said first RPC structure and includes one or more fields in addition to said first set of fields; and said one or more fields are populated with said default values prior to said execution of the first remote procedure call.

41. The computer system of claim 37, wherein the first RPC structure comprises a discriminant identifying which one of two or more mutually exclusive fields is included in the first RPC structure.

42. The computer system of claim 37, wherein:

said communication module is further configured to communicate a second RPC structure of said second set of RPC structures to the remote computing entity after said execution of the first remote procedure call; and if said second version identifier is more recent than said first version identifier, omitting one or more of said fields of said second RPC structure in said communication of said second RPC structure.

43. The computer system of claim 42, wherein two or more fields of said second RPC structure are mutually exclusive in that only one of said two or more fields is included in said second RPC structure when said communication module communicates said second RPC structure to the remote computing entity.

44. The computer system of claim 43, wherein the second RPC structure comprises a discriminant identifying which one of said two or more fields is included in the second RPC structure.

45. The computer system of claim 37, wherein one of said negotiation module and said communication module comprises the other of said negotiation module and said communication module.

46. A computer readable storage medium containing a data structure configured as a remote procedure call (RPC) record for facilitating a remote procedure call, the data structure comprising:

a header indicating a type of RPC record;

one or more field definitions; and within each said field definition, a version identifier, wherein the version identifier reflects the current version of a given field within the RPC structure and is independent of version identifiers for other fields in the RPC structure, whereby the version identifier for each field in the set of fields within a given RPC structure is used to identify a common set of fields between a set of RPC structures.

47. The computer readable storage medium of claim 46, wherein said data structure further comprises:

within a first said field definition, a default value for said defined field.

48. The computer readable storage medium of claim 46, wherein said data structure further comprises:

within each said field definition, a default value for said defined field.

49. The computer readable storage medium of claim 46, wherein:

said one or more field definitions includes definitions of a plurality of alternative fields; and said header comprises a discriminant configured to indicate which of said alternative fields is included in said data structure.

* * * * *